(No Model.)
P. WIEDERER.
MIRROR.
No. 433,707. Patented Aug. 5, 1890.
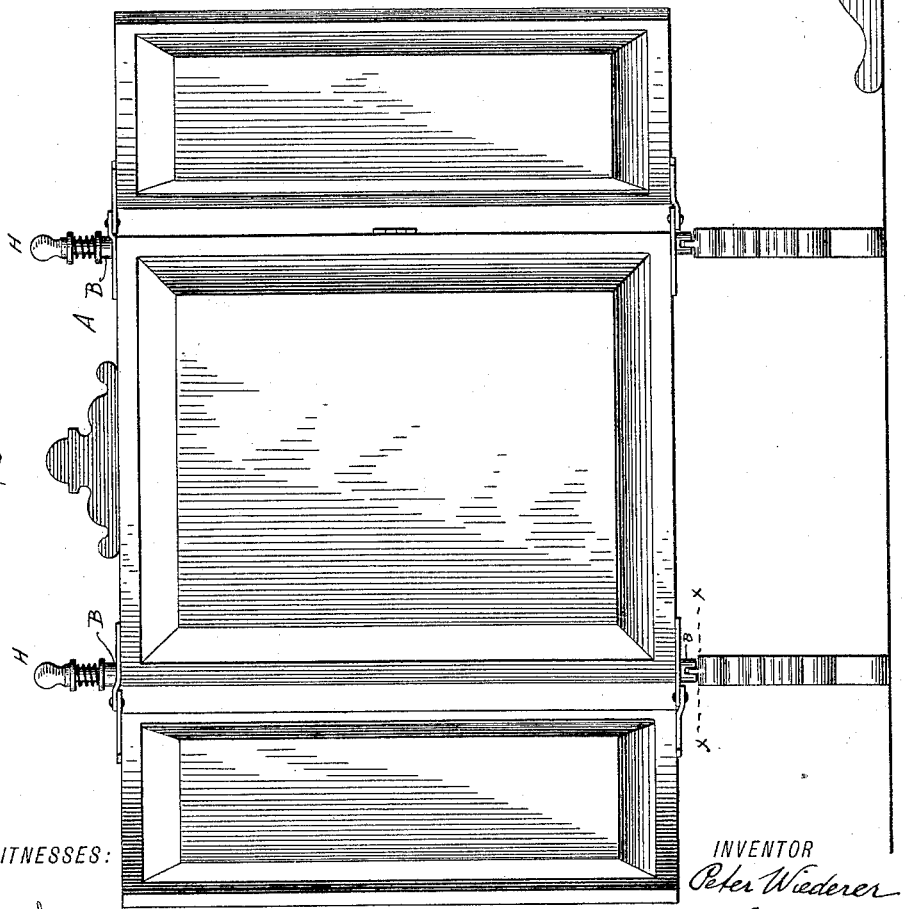
INVENTOR
Peter Wiederer
WITNESSES:
ATTORNEYS

UNITED STATES PATENT OFFICE.

PETER WIEDERER, OF STAPLETON, NEW YORK.

MIRROR.

SPECIFICATION forming part of Letters Patent No. 433,707, dated August 5, 1890.

Application filed September 17, 1889. Serial No. 324,220. (No model.)

*To all whom it may concern:*

Be it known that I, PETER WIEDERER, of Stapleton, in the county of Richmond and State of New York, a citizen of the United States, have invented certain new and useful Improvements in Mirrors, of which the following is a specification.

This invention relates to improvements in mirrors; and the object of my invention is to provide a mirror with legs, which when the mirror is to be rested upon said legs can be turned to be about at right angles to the plane of the mirror, and when the mirror is not in use or when it is to be suspended by a chain can be brought into a position parallel with the plane of the mirror.

The invention consists in the combination, with a mirror having sleeves on its back, of rods mounted to turn and slide in said sleeves, legs secured to the lower ends of the rods, and springs for pressing the rods upward, the legs having teeth that can enter notches in the lower sleeves.

In the accompanying drawings, Figure 1 is a front view of a triplicate mirror provided with my improvements, the mirror being open. Fig. 2 is a side view of the mirror closed. Fig. 3 is a rear view of the mirror, parts being broken out. Fig. 4 is an enlarged detail longitudinal sectional view of the upper part of one of the rods. Figs. 5 and 6 are enlarged detail sectional views on the line *x x*, Fig. 1, showing the legs in the different positions.

Similar letters of reference indicate corresponding parts.

On the back of the mirror A, at each side edge, a sleeve or guide-tube B is arranged at the top and bottom, and through the same a rod C is passed in such a manner that it can turn axially in said sleeves, the legs D being secured to the lower ends of said rods. A washer E is placed on the upper end of each top sleeve B, and on the same one end of a spiral spring F rests, which surrounds the upper projecting end of the rod C. A washer G is then placed on the spring F, and an ornamental button or nut H is screwed on the upper end of the rod. The bottom sleeves B project slightly below the bottom edge of the mirror, and are each provided in the front with a notch or recess J for receiving the teeth K, projecting upward from the tops of the leg D.

When the mirror is erected for use, the legs are at right angles to the plane of the mirror, the teeth K of the legs B resting in the notches J of the bottom sleeves, whereby said legs are locked in place. When the legs are to be brought into the position parallel with the plane of the mirror, they are pulled downward sufficiently to remove the teeth K from the notches J and then turned ninety degrees, the upper edges of the teeth K resting on the bottom edges of the sleeves B. When the legs are to be brought into position again at right angles to the plane of the mirror, the said legs are turned ninety degrees in the reverse direction, and when the teeth K arrive at the notches J they snap into the same by the action of the springs F on the knobs or nuts H on the upper ends of the rods C. The tension of the springs F can be adjusted by means of the nuts or knobs H, and thus the resistance against pulling the legs and the rods downward increased or decreased at will.

Having thus described my invention, I claim as new and desire to secure by Letters Patent—

The combination, with a mirror, of guide-sleeves secured to the back of the same at the side edges, the lower guide-sleeves having notches in their bottom edges, of rods mounted to turn and slide in said sleeves, legs secured on the lower ends of said rods, teeth on said legs, which teeth can pass into the notches in the bottom sleeves, springs surrounding the upper ends of the rods and resting on the upper ends of the upper sleeves, and nuts screwed on the upper ends of the said rods, substantially as set forth.

In testimony that I claim the foregoing as my invention I have signed my name in presence of two subscribing witnesses.

PETER WIEDERER.

Witnesses:
 W. REIMHERR,
 JOHN ALONZO STRALEY.